United States Patent
Yang et al.

(10) Patent No.: US 9,545,752 B2
(45) Date of Patent: Jan. 17, 2017

(54) FILM-APPLYING MACHINE

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Jie Ni, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 343 days.

(21) Appl. No.: 14/452,521

(22) Filed: Aug. 5, 2014

(65) Prior Publication Data

US 2015/0041065 A1 Feb. 12, 2015

(30) Foreign Application Priority Data

Aug. 6, 2013 (CN) .................. 2013 1 03385321

(51) Int. Cl.
  *B29C 65/00* (2006.01)
  *B29C 65/78* (2006.01)
  *B25B 11/00* (2006.01)
  *B29C 63/00* (2006.01)
  *B29C 63/02* (2006.01)
  *B65B 33/00* (2006.01)

(52) U.S. Cl.
  CPC ......... *B29C 65/7847* (2013.01); *B25B 11/005* (2013.01); *B29C 63/0004* (2013.01); *B29C 63/02* (2013.01); *B65B 33/00* (2013.01); *Y10T 156/17* (2015.01); *Y10T 156/1778* (2015.01)

(58) Field of Classification Search
  CPC ............... Y10T 156/1776; Y10T 156/1778; Y10T 156/178; Y10T 156/1783; B29C 65/7847; B29C 66/342; B29C 66/345; B25B 11/005; B25B 11/007; B65C 9/14; B32B 37/003; B32B 38/1858
  USPC ........... 156/486, 489, 570, DIG. 31; 269/21
  See application file for complete search history.

(56) References Cited

U.S. PATENT DOCUMENTS 4,293,365 A * 10/1981 Geyser .................. B65C 3/10
                                                156/364
2014/0020843 A1* 1/2014 Lu ....................... B32B 38/0004
                                                156/512

FOREIGN PATENT DOCUMENTS

CN           202098569 U      1/2012

* cited by examiner

*Primary Examiner* — John Goff
(74) *Attorney, Agent, or Firm* — Zhigang Ma

(57) ABSTRACT

A film-applying machine includes a bracket, a mechanical arm, an application apparatus, and a storage apparatus. The storage apparatus includes a storage mechanism, a driving mechanism, and a first rolling mechanism. The storage mechanism includes a supporting frame mounted to the bracket, and a storage assembly adjustably coupled to the supporting frame. The driving mechanism includes a supporting member and a driving assembly. The supporting member couples with the supporting frame. The driving assembly includes a driving member coupled to the supporting member and a first transmission belt coupled to the driving member. The first rolling mechanism includes a pressing plate and a plurality of rollers. An end of the pressing plate couples with the first transmission belt, and another end is coupled to the supporting frame. The rollers are rotatably mounted on the pressing plate.

20 Claims, 9 Drawing Sheets

FILM-APPLYING MACHINE

FIELD

The present disclosure relates to film-applying machines to apply protective films.

BACKGROUND

When an electronic device is being machined, a surface of the electronic device can be coated with a piece of protective film. A film-applying machine can be used to apply the protective film.

BRIEF DESCRIPTION OF THE DRAWINGS

Implementations of the present technology will now be described, by way of example only, with reference to the attached figures.

DETAILED DESCRIPTION

Figure 1:
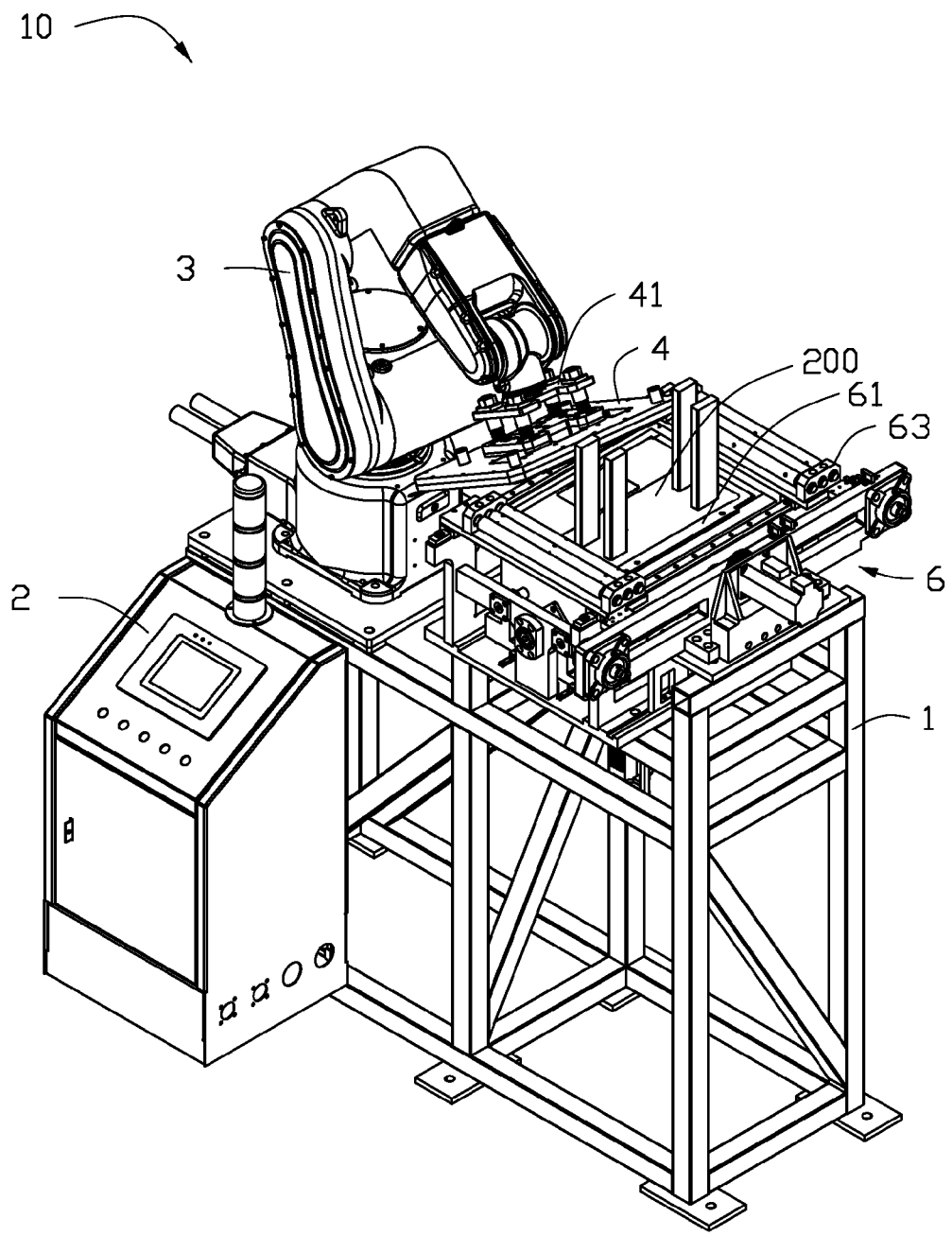
FIG. 1 is an isometric view of an embodiment of a film-applying machine including a application apparatus, a storage apparatus, and a peeling apparatus, the storage apparatus including a rolling mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined as to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to film-applying machines.

A machine to apply a protective film (film-applying machine) can include a bracket, a mechanical arm adjacent to the bracket, an application apparatus coupled to the mechanical arm, a storage apparatus coupled to the bracket, and a controlling platform. The storage apparatus can include a storage mechanism, a driving mechanism, and a first rolling mechanism. The storage mechanism can include a supporting frame mounted to the bracket, and a storage assembly adjustably coupled to the supporting frame. The driving mechanism can include a supporting member and a driving assembly. The supporting member can be coupled to the supporting frame. The driving assembly can include a driving member coupled to the supporting member and a first transmission belt coupled to the driving member. The first rolling mechanism can include a pressing plate and a plurality of rollers. An end of the pressing plate can be coupled to the first transmission belt, and another end can be slidably coupled to the supporting frame. The plurality of rollers can be rotatably mounted on the pressing plate.

The driving member can be configured to drive the first transmission belt and the first rolling assembly to slide relative to the storage assembly, such that the first rolling assembly can be configured to flatten a protective film supported on the storage assembly. The mechanical arm can be configured to drive the application apparatus to vacuum-lift a top layer| of the protective film and move the application apparatus and the top layer to resist against the plurality of rollers and keep reciprocating relative to the rollers. The mechanical arm can be configured to drive the application apparatus to apply the top layer. The controlling platform can be electrically coupled to the mechanical arm, the application apparatus, and the storage apparatus, and can be configured to control the mechanical arm, the application apparatus, and the storage apparatus to cooperate to apply the protective film to the workpiece.

Figure 2:
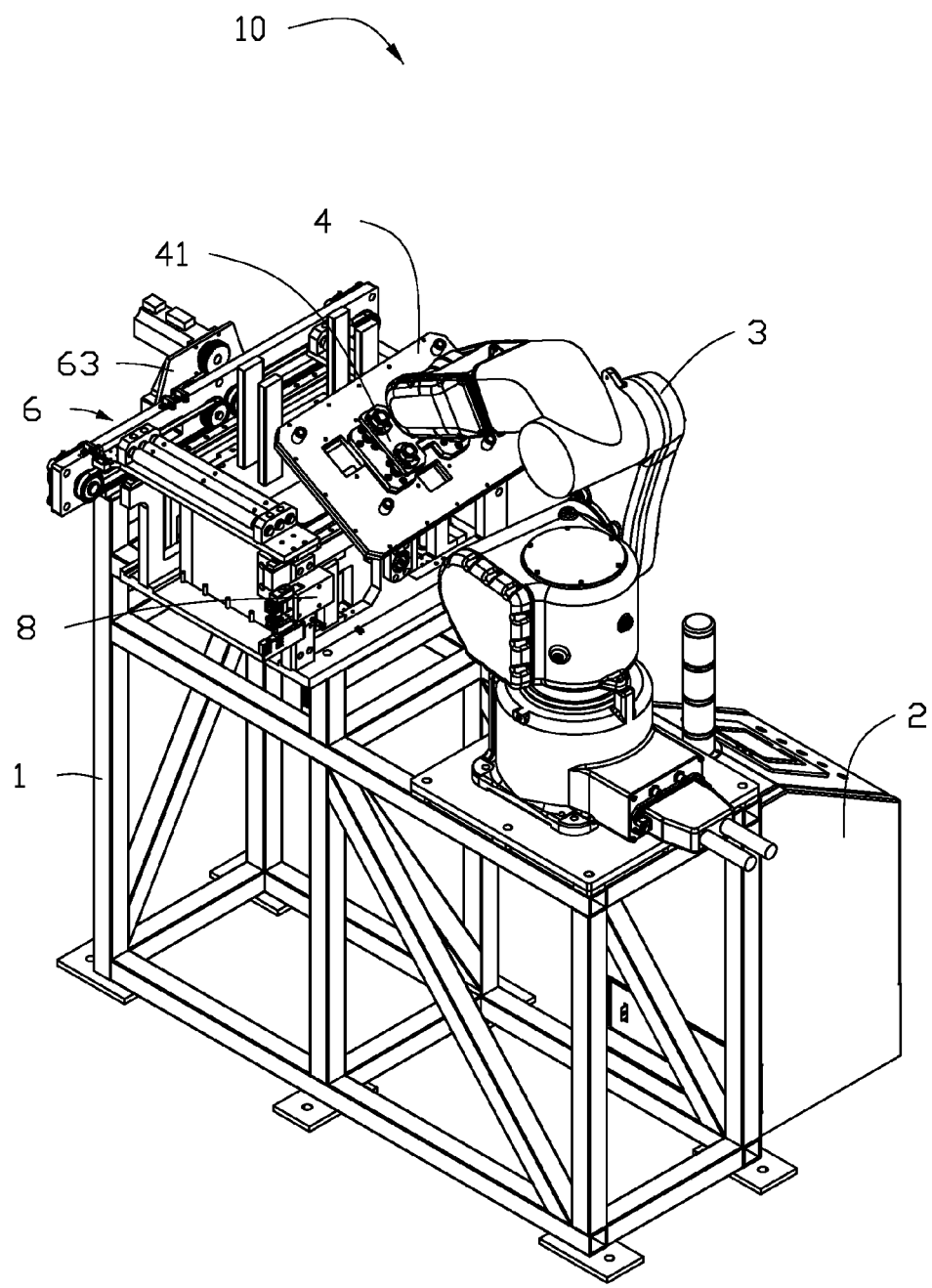
FIG. 2 is similar to FIG. 1 but viewed from another angle.

FIGS. 1-2 illustrate an embodiment of a film-applying machine 10 which can be arranged beside a production line (not shown), and configured to apply a protective film 200 onto a workpiece (not shown) carried by the production line. The film-applying machine 10 can include a bracket 1, a controlling platform 2, a mechanical arm 3, an application apparatus 4, a storage apparatus 6, and a peeling apparatus 8 (shown in FIG. 2). The bracket 1 can be disposed in a working environment. The controlling platform 2 can be mounted beside the bracket 1. The mechanical arm 3 can be mounted on the bracket 1 and positioned adjacent to the controlling platform 2. The application apparatus 4 can be mounted to an end of the mechanical arm 3. The storage apparatus 6 can be mounted to the bracket 1 and positioned adjacent to the mechanical arm 3. The peeling apparatus 8 can be mounted at a side of the storage apparatus 6 adjacent to the mechanical arm 3.

The controlling platform 2, having a built-in program, can be electrically coupled to the mechanical arm 3, the application apparatus 4, the storage apparatus 6, and the peeling apparatus 8. The controlling platform 2 can control the apparatuses mentioned above to cooperate with each other and complete a film-pasting process. In at least one embodiment, the mechanical arm 3 can be a six-axis robot arm. In at least one embodiment, the mechanical arm 3 can be mounted on other member, such as, but not limited to, the ground or a supporting frame (not shown). The mechanical arm 3 can be positioned adjacent to the storage apparatus 6 and configured to take a piece of the protective film 200 from the storage apparatus 6 onto the workpiece carried on the production line.

Figure 3:
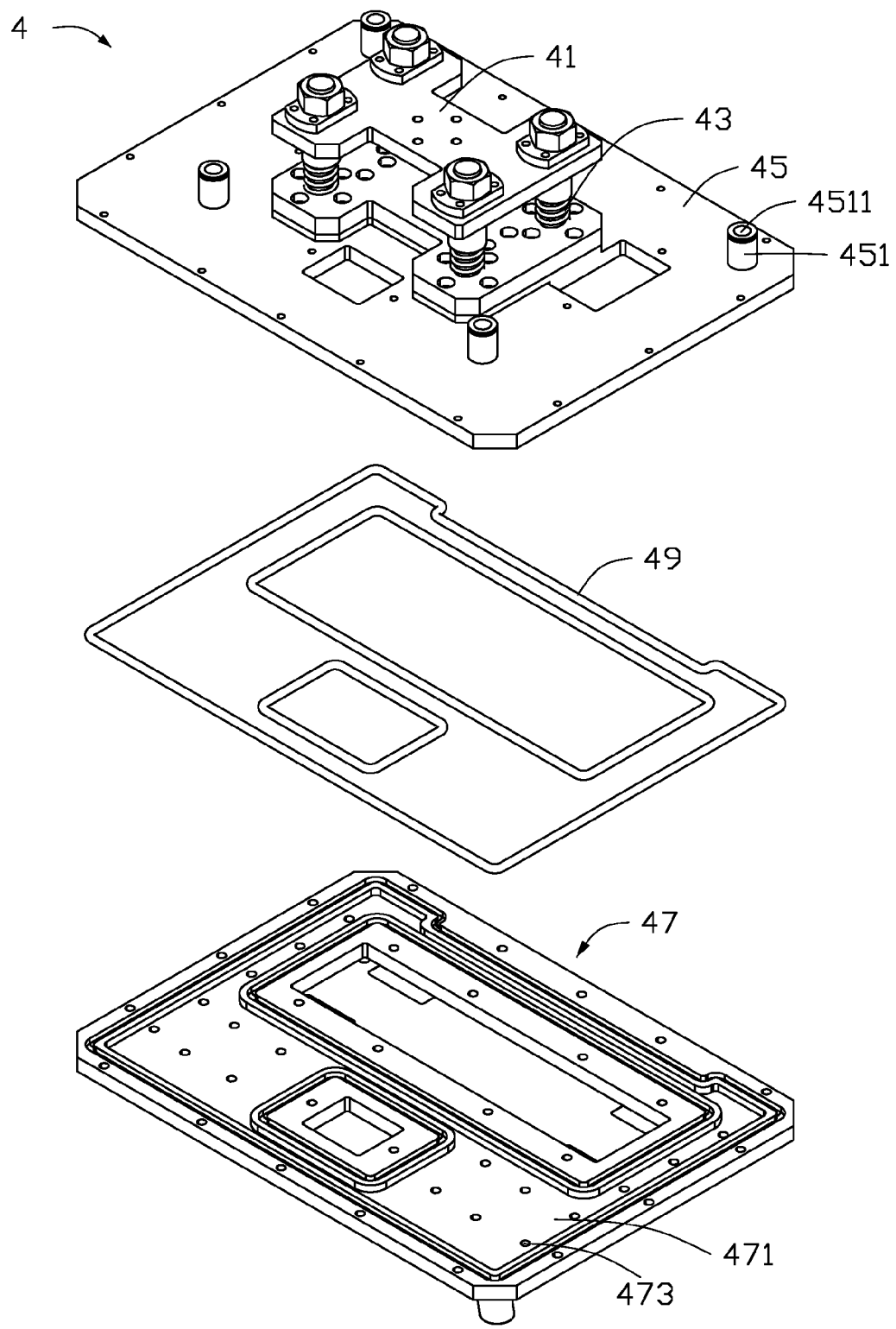
FIG. 3 is an exploded isometric view of the application apparatus of the film-applying machine of FIG. 1.

Referring to FIG. 3, the application apparatus 4 can be mounted to an end of the mechanical arm 3 and can be configured to vacuum-lift a protective film 200 and applying the protective film 200 onto a workpiece (not shown) carried by the production line. The application apparatus 4 can include a first mounting plate 41, a cushion 43, a second mounting plate 45, and a sucking plate 47. The first mounting plate 41 can be mounted to the mechanical arm 3. A first end portion of the cushion 43 can be coupled to the first mounting plate 41, and a second end portion can be coupled to the second mounting plate 45. The cushion 43 can be elastic and configured to protect the workpiece from damage during the film-pasting process.

The second mounting plate 45 can be substantially a rectangular plate. A plurality of connecting members 451 can be provided at a side of the second mounting plate 45 adjacent to the cushion 43. Each connecting member 45 can define an inlet 4511. The inlet 4511 can extend through the connecting member 451 and the second mounting plate 45. In the illustrated embodiment, there are four connecting members 451. In at least one embodiment, a number of the connecting members 45 can be one or more than one. The connecting member 45 can be configured to couple with an external air-providing apparatus (not shown) to evacuate or generate gas.

The sucking plate 47 can be mounted on another side of the second mounting plate 45 away from the connecting members 451. The sucking plate 47 can be stacked up on the side of the second mounting plate 45 away from the cushions 43. The sucking plate 47 can define a sunken portion 471 on a surface facing the second mounting plate 45. The sunken portion 471 and the second mounting plate 45 can define a receiving cavity (not shown) for receiving gas. A bottom surface of the sunken portion 471 can define a plurality of holes 473 communicating with the sunken portion 471. A plurality of sealing members 49 can be provided between the second mounting plate 45 and the sucking plate 47. The sealing members 49 can surround edges of the sunken portion 471. The inlet 4511, the sunken portion 471, and the holes 471 can define a gas channel, such that the application apparatus 4 can attract and lift the protective film 200 when gas is sucked from the holes 473, the receiving cavity, and the connecting member 451; the application apparatus 4 can release the protective film 200 onto the workpiece when gas from the external air-providing apparatus is introduced to the holes 473.

Figure 4:
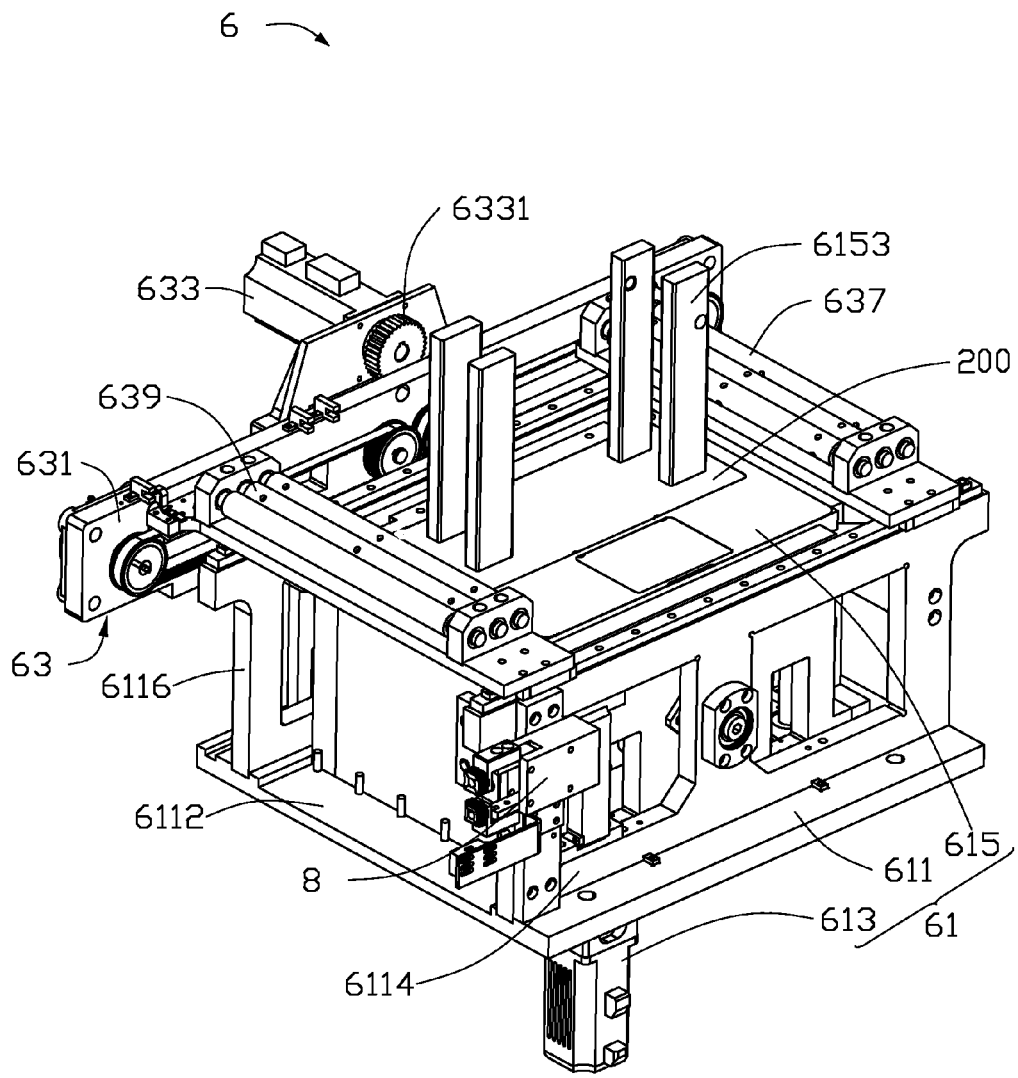
FIG. 4 is an isometric view of the storage apparatus of the film-applying machine of FIG. 1.
Figure 5:
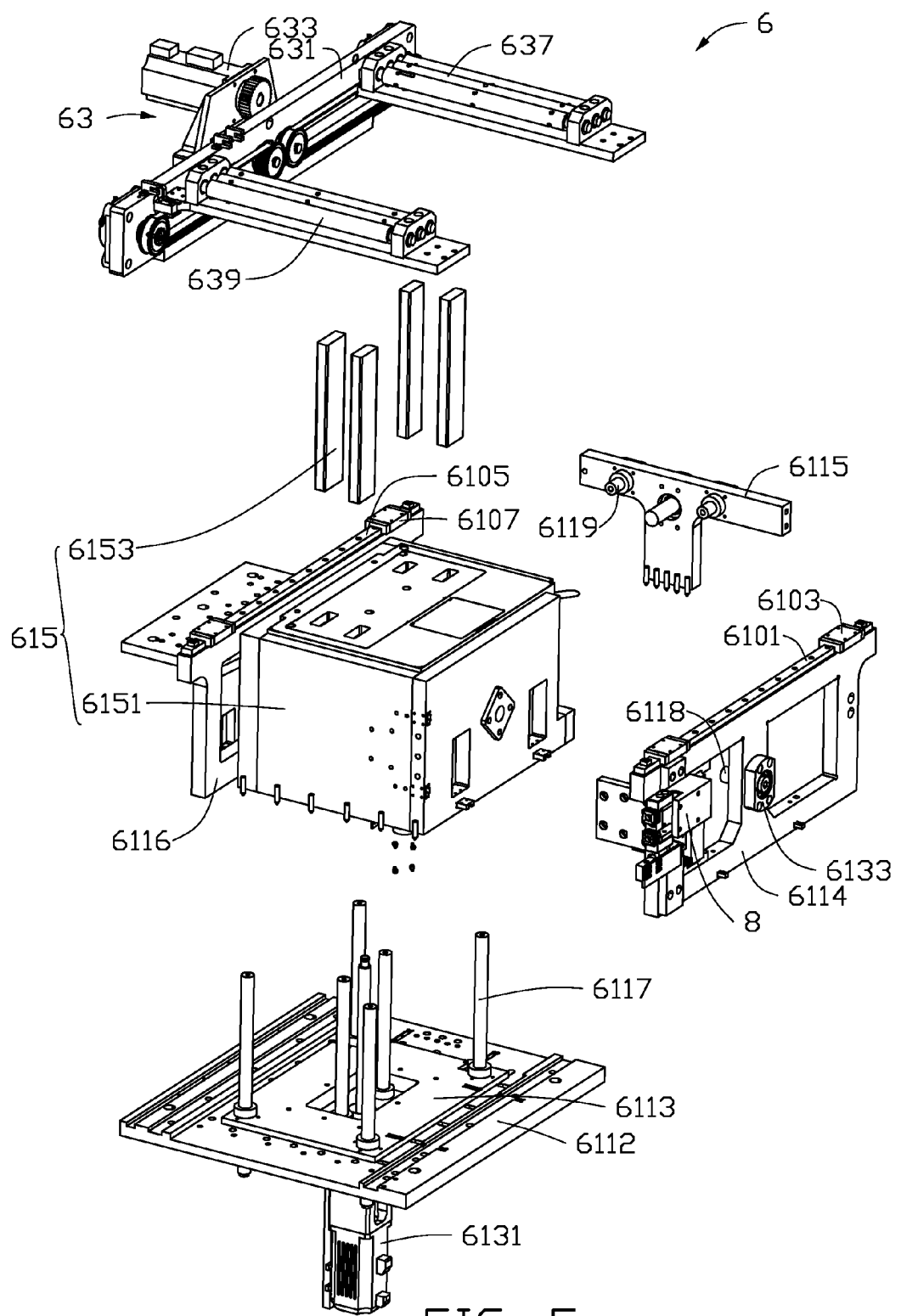
FIG. 5 is an exploded isometric view of the storage apparatus of FIG. 4.

Referring to FIG. 4, the storage apparatus 6 can be mounted on the bracket 1 and positioned adjacent to the mechanical arm 3. The storage apparatus 6 can be configured to store a plurality of multilayer protective film 200. The storage apparatus 6 can include a storage mechanism 61 coupled to the bracket 1 and a rolling mechanism 63 mounted on the storage mechanism 61.

Referring to FIGS. 4-7, the storage mechanism 61 can include a supporting frame 611, an adjusting assembly 613, and a storage assembly 615.

The supporting frame 611 can include a basic plate 6112, a movable plate 6113, a first holder 6114, a second holder 6115, a third holder 6116, and a guiding assembly 6117. The basic plate 6112 can be substantially a rectangular plate and can be mounted to the bracket 1. The movable plate 6113 can be substantially a rectangular plate and movably mounted to a side of the basic plate 6112 away from the bracket 1. The movable plate 6113 can be positioned substantially on a middle of the base plate 6112 and configured to slide on the basic plate 6112.

The first holder 6114 can be mounted to the basic plate 6112 and can be substantially perpendicular to the basic plate 6112. The first holder 6114 can provide a first rail 6101 at a side thereof away from the basic plate 6112. A plurality of first sliding members 6103 can be slidably coupled to the first rail 6101. In the illustrated embodiment, there can be two first sliding members 6103. The two first sliding members 6103 can be configured to slide along the first rail 6101.

The second holder 6115 can be mounted to the basic plate 6112 and coupled to the first holder 6114. The second holder 6115 can be substantially perpendicular to the first holder 6114 and the basic plate 6112.

The third holder 6116 can be mounted on the basic plate 6112 and coupled to the second holder 6115. The third holder 6116 can be substantially parallel to the first holder 6114. The third holder 6116 can provide a second rail 6105 at a side thereof away from the basic plate 6112. A plurality of second sliding members 6107 can be slidably coupled to the second rail 6105. In the illustrated embodiment, there are two second sliding members 6107. The two sliding members 6107 can be configured to slide along the second rail 6105.

The guiding assembly 6117 can be substantially perpendicularly mounted on the movable plate 6113 and positioned among the first holder 6114, the second holder 6115, and the third holder 6116. In the illustrated embodiment, the guiding assembly 6117 can include six guiding rods.

A first guiding rod 6118 can be provided on a side of the first holder 6114 facing the guiding assembly 6117. The first guiding rod 6118 can be substantially perpendicularly mounted on the first holder 6114, to extend along a first direction parallel to the base plate 6112 and towards the guiding assembly 6117. A second guiding rod 6119 can be provided on a side of the second holder 6115 adjacent to the guiding assembly 6117. The second guiding rod 6119 can be substantially perpendicularly mounted on the second holder 6115 and extend along a second direction parallel to the base plate 6112 towards the guiding assembly 6117. The second guiding rod 6119 can be substantially perpendicular to the first guiding rod 6118. The guiding assembly 6117, the first guiding rod 6118, and the second guiding rod 6119 can be configured to cooperate with the adjusting assembly 613 to locate the storage apparatus 615.

Figure 6:
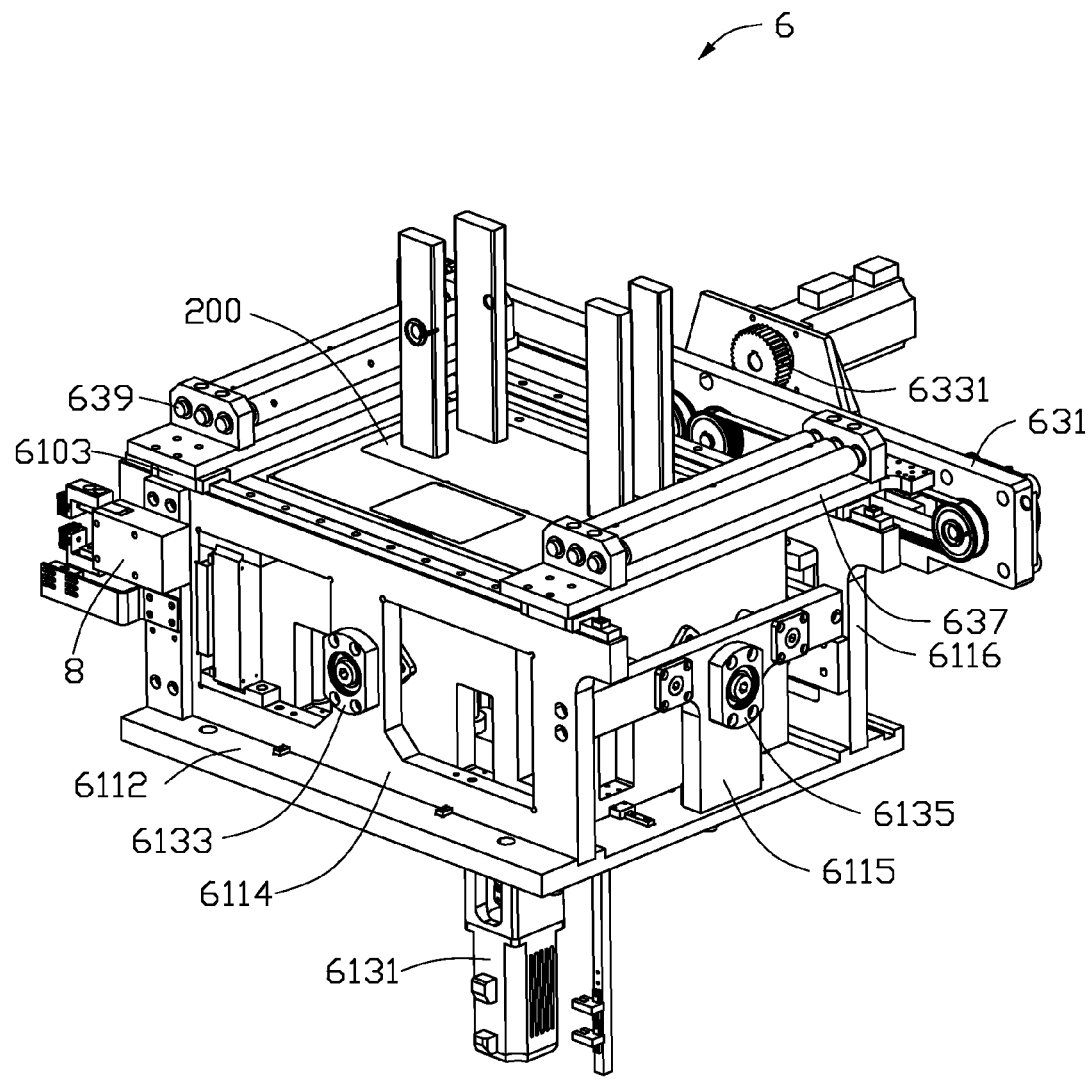
FIG. 6 is similar to FIG. 4, but viewed from another angle.
Figure 7:
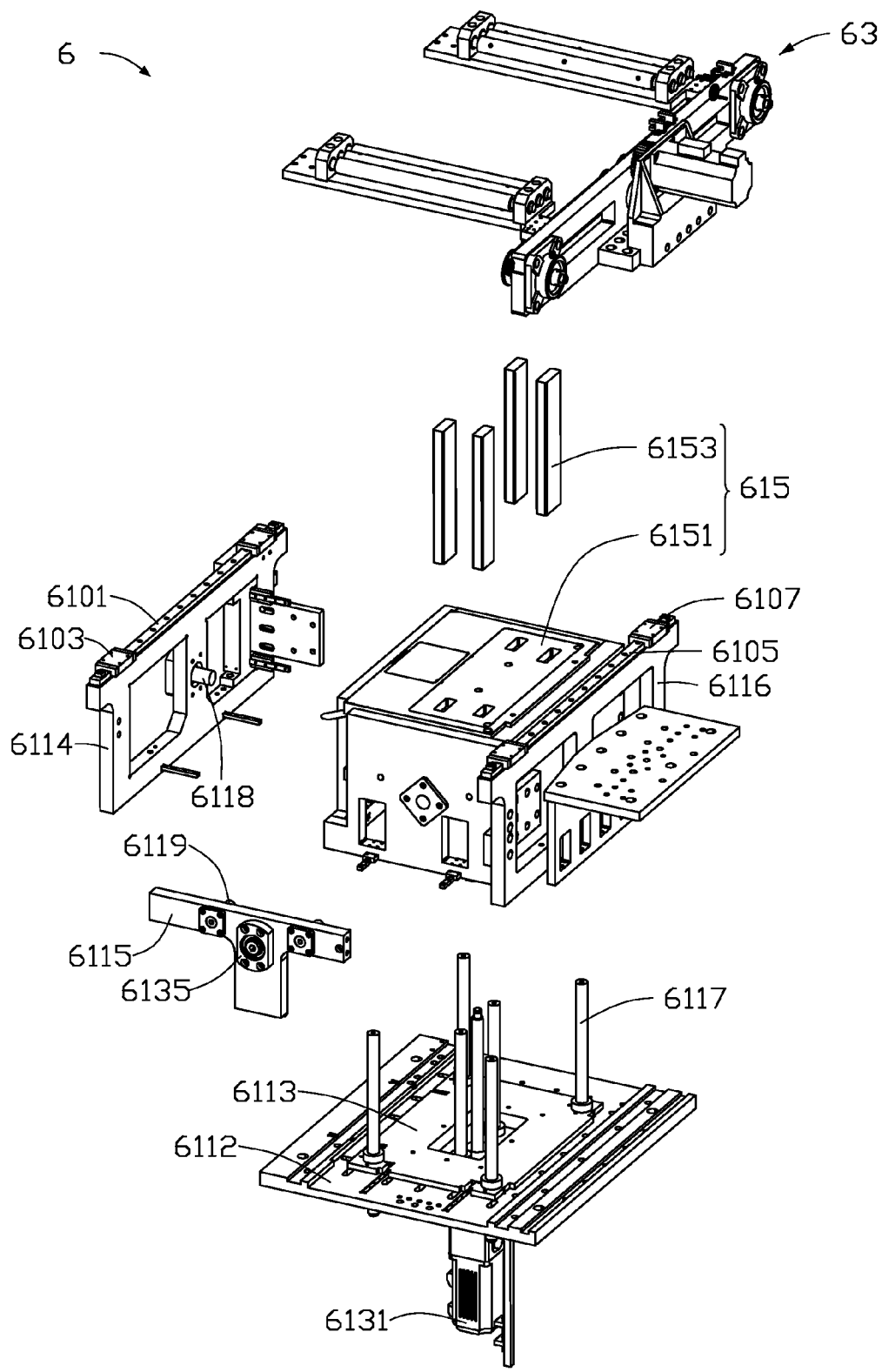
FIG. 7 is an exploded isometric view of the storage apparatus of FIG. 6.
Figure 8:
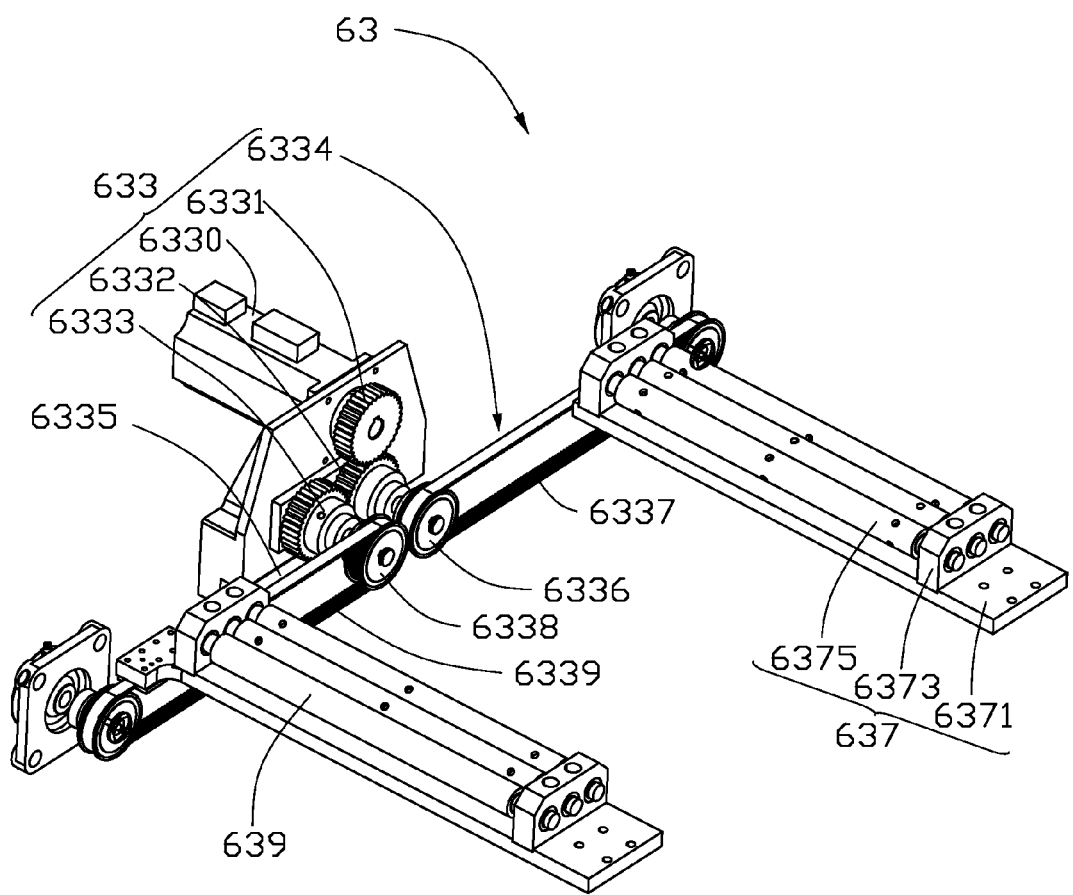
FIG. 8 is an isometric view of the rolling mechanism of the storage apparatus of FIG. 4.

The adjusting assembly 613 can include a lifting adjusting member 6131, a first adjusting member 6133, and a second adjusting member 6135 (shown in FIG. 6). The lifting adjusting member 6131 can be mounted to a side of the basic plate 6112 away from the guiding assembly 6117. An end of the lifting adjusting member 6131 can extend through the basic plate 6112 and the movable plate 6113 to couple with the storage assembly 615. The lifting adjusting member 6131 can be configured to adjust a height of the storage assembly 615. In at least one embodiment, the lifting adjusting member 6131 can be driven by a servo motor. When the multilayer protective film 200 in the storage assembly 615 is thinner in thickness, the lifting adjusting member 6131 can uplift the storage assembly 615 appropriately. Thus, a top layer of the protective film 200 can be lifted, to enable the application apparatus 4 to vacuum-lift the top layer and further enable the rolling mechanism 63 to flatten the protective film 200. The first adjusting member 6133 can be mounted on a side of the first holder 6114 away from the first guiding rod 6118. An end of the first adjusting member 6133 can extend through the first holder 6114 and couple with the storage assembly 615. The first adjusting member 6133 can be configured to adjust a location of the storage assembly 615 along the first direction. The second adjusting member 6135 can be mounted on a side of the second holder 6115 away from the second guiding rod 6119. An end of the second adjusting member 6135 can extend through the second holder 6115 and couple with the storage assembly 615. The second adjusting member 6135 can be configured to adjust a location of the storage assembly 615 along the second direction.

The storage assembly 615 can include a storage member 6151 and a plurality of positioning members 6153. The storage member 6151 can be movably mounted to the basic plate 6112 and positioned between the first holder 6114 and the second holder 6115. The storage member 6151 can be configured to receive the multilayer protective film 200. The storage member 6151 can be sleeved on the guiding assembly 6117 via a bottom surface thereof The storage member 6151 can be sleeved on the first guiding rod 6118 via a sidewall facing the first holder 6114 and sleeved on the second guiding rod 6119 via a sidewall facing the second holder 6115. The storage member 6151 can be coupled to the lifting adjusting member 6131, the first adjusting member 6133, and the second adjusting member 6135. The positioning member 6153 can be removably coupled to a side of the storage member 6151 away from the basic plate 6112. The positioning member 6153 can be configured to precisely position the protective film 200.

Referring to FIGS. 4-6 and 8, the rolling mechanism 63 can be mounted at a side of the storage member 6151 away from the basic plate 6112. The rolling mechanism 63 can be configured to flatten the protective film 200 and iron out any air bubbles between the sucking plate 47 and the protective film 200, thereby improving a quality of film application process. The rolling mechanism 63 can include a supporting member 631, a driving assembly 633, a first rolling assembly 637, and a second rolling assembly 639.

The supporting member 631 can be substantially a rectangular plate perpendicularly mounted to the third holder 6116.

The driving assembly 633 can include a driving member 6330, a driver 6331, a first transmission member 6332, a second transmission member 6333, a first follower 6334, and a second follower 6335. The driving member 6330 can be mounted to a side of the storage member 6151 away from the basic plate 6112 and positioned substantially on the middle of the storage member 6151. In at least one embodiment, the driving member 6330 can be a motor. The driver 6331 can be mounted to an end of the driving member 6330 adjacent to the supporting member 631.

The first transmission member 6332 can be mounted to a side of the supporting member 631 adjacent to the driving member 6330 and meshed with the driver 6331. The second transmission member 6333 can be mounted to the supporting member 631 and meshed with the first transmission member 6332. In the illustrated embodiment, the driver 6331, the first transmission member 6332, and the second transmission member 6333 can be toothed gears.

The first follower 6334 can be mounted to a side of the supporting member 631 away from the driving member 6330. The first follower 6334 can include two first pulleys 6336 spaced from each other. A first transmission belt 6337 can be wound on the two first pulleys 6336. One of the two first pulleys 6336 can be mounted to the supporting member 631 corresponding to the first transmission member 6332 and coupled to the first transmission member 6332. Another first pulley 6336 can be mounted to an end of the supporting member 631.

The second follower 6335 can be mounted on the supporting member 631 and adjacent to the first follower 6334. The second follower 6335 can include two second pulleys 6338 spaced from each other. A second transmission belt 6339 can be wound on the two second pulleys 6338. One of the two second pulleys 6338 can be mounted to the supporting member 631 corresponding to the second transmission member 6333 and coupled to the second transmission member 6333. Another second pulley 6338 can be mounted to an end of the supporting member 631. In at least one embodiment, the first transmission belt 6337 and the second transmission belt 6339 can be same-speed belts.

The first rolling assembly 637 and the second rolling assembly 639 can be substantially parallel to each other and can be movably coupled to the first holder 6114 and the third holder 6116. The first rolling assembly 637 can be coupled to the first transmission belt 6337, and the second rolling assembly 639 can be coupled to the second transmission belt 6339. The driving member 6330 can move the transmission member 635, such that the first assembly 637 and the second rolling assembly 639 can slide towards or away from each other along a direction parallel to the basic plate 6112.

The first rolling assembly 637 can correspond to the first follower 6334 and include a pressing plate 6371, two bases 6373, and a plurality of rollers 6375. The pressing plate 6371 can be substantially a rectangular plate and positioned perpendicular to the supporting member 631. An end of the pressing member 6371 can be coupled to one of the two second sliding members 6107; another end can extend towards the first holder 6114 and couple with one of the two first sliding members 603. The bases 6373 can be mounted to opposite ends of the pressing plate 6371. The plurality of the rollers 6375 can be substantially parallel to each other. Opposite ends of each roller 639 can be rotatably coupled to the bases 6373.

The second rolling assembly 639 can correspond to the second follower 6335. A structure and a location of the second rolling assembly 639 can be similar to those of the first rolling assembly 637. The second rolling assembly 639 can include a pressing plate, two bases, and a plurality of rollers. For the sake of simplicity, a description of the second rolling assembly 639 is omitted. When the mechanical arm 3 drives the application apparatus 4 to vacuum-lift a piece of the multilayer protective film 200, the first rolling assembly 637 and the second rolling assembly 639 can slide towards each other and stop at the middle of the supporting member 631. The mechanical arm 3 can drive the application apparatus 4 and the piece of the multilayer protective film 200 on the application apparatus 4 to resist against the rollers 6375 and keep reciprocating relative to the rollers 6375, such that air bubbles between the protective film 200 and the application apparatus 4 can be ironed out.

Figure 9:
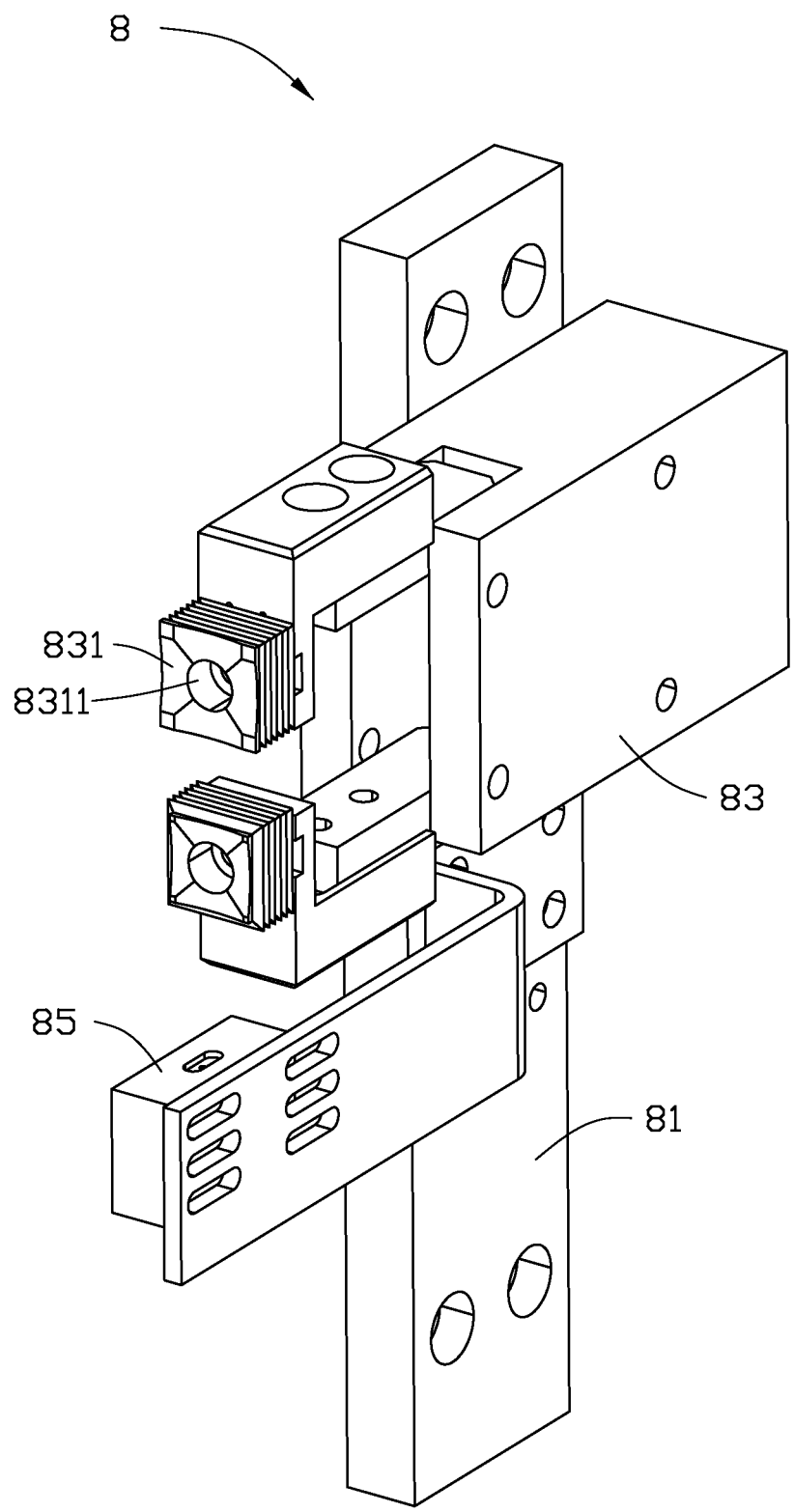
FIG. 9 is an isometric view of the peeling apparatus of the film-applying machine of FIG. 1.

Referring to FIG. 9, the peeling apparatus 8 can be mounted on a side of the first holder 6114 adjacent to the mechanical arm 3. The peeling apparatus 8 can be configured to peel off any backing paper adhering on the protective film 200. In an alternative embodiment, the peeling apparatus 8 can be mounted on the bracket 1 and adjacent to the mechanical arm 3 such that the mechanical arm 3 can reach the peeling apparatus 8. The peeling apparatus 8 can include a holding member 81 mounted on the first holder 6114, a sucking member 83 mounted on the holding member 81, and a sensor 85 mounted on the holding member 81. The sucking member 83 can be substantially hollow. A gas nozzle 831 can be provided at an end of the sucking member 83. The gas nozzle 831 can be a stack of flexible pieces. An end surface of the gas nozzle 831 can be substantially concave, such that the gas nozzle 831 can manipulate the backing paper without damaging the protective film 200. When an end surface of the gas nozzle 831 is pressed, the gas nozzle 831 can be deformed, such that the backing paper can be attached on the gas nozzle 831. The gas nozzle 831 can define a longitudinal through hole 8311. The sensor 85 can be positioned adjacent to the gas nozzle 831. When the sensor 85 senses that the mechanical arm 3 has driven the protective film 200 towards the gas nozzle 831, the sucking member 83 can evacuate air. Thus, the backing paper protective film 200 can be firmly adhered on the gas nozzle 831 and the mechanical arm 3 can move the protective film 200 away from the peeling apparatus 8, to leave the backing paper adhered on the gas nozzle 831. In an alternative embodiment, the peeling apparatus 8 can be omitted, such that the backing paper can be peeled off by hand or by a robot.

In operation, the multilayer protective film 200 can be stacked in the storage member 6151 via the positioning member 6153, and then the positioning member 6153 can be removed from the storage member 6151. The controller 2 can control the mechanical arm 3 and the application apparatus 4 to move close to the multilayer protective film 200. The sucking plate 47 can resist against a top layer of the protective film 200. The external air-providing apparatus can evacuate air via the application apparatus 4, such that the top layer can be adhered onto the sucking plate 47. The mechanical arm 3 can move the application apparatus 4 and the top layer of protective film 200 way from the storage member 6151. The driving assembly 633 can drive the first rolling assembly 637 and the second rolling assembly 639 to slide towards each other and stop at the middle of the supporting member 631, thereby flattening the multilayer protective film 200 on the storage member 6151. The mechanical arm 3 can drive the application apparatus 4 and the top layer of protective film 200 to resist against the rollers 6375 and keep reciprocating relative to the rollers 6375, such that air bubbles can be ironed out. The mechanical arm 3 can move the application apparatus 4 and the top layer close to the peeling apparatus 8, the sucking member 83 can evacuate air, such that the backing paper of the top layer can be firmly adhered on the gas nozzle 831, and the mechanical arm 3 can move the protective film away from the peeling apparatus 8, leaving the release paper on the gas nozzle 831. The mechanical arm 3 can drive the application apparatus 4 to apply the top layer of the protective film 200 onto the workpiece.

In an alternative embodiment, the second rolling assembly 639 can be omitted; accordingly, the second transmission member 6333 and the second follower 6335 can be omitted. The two first pulleys 6336 can be mounted on opposite ends of the supporting member 631, and the driving member 6330, the driver 6331, and the first transmission member 6332 can be mounted on one end of the supporting member 631 corresponding to one of the two pulleys 6336.

The embodiments shown and described above are only examples. Many details are often found in the art such as the other features of a piston. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

The invention claimed is:

1. A film-applying machine comprising:
   a bracket;
   a mechanical arm adjacent to the bracket;
   an application apparatus coupled to the mechanical arm; and
   a storage apparatus coupled to the bracket and comprising:
      a storage mechanism comprising:
         a supporting frame mounted to the bracket; and
         a storage assembly adjustably coupled to the supporting frame;
      a driving mechanism comprising:
         a supporting member coupled to the supporting frame;
         a driving assembly, comprising a driving member coupled to the supporting member; and
         a first transmission belt coupled to the driving member; and
      a first rolling mechanism comprising:
         a pressing plate having an end coupled to the first transmission belt and another end slidably coupled to the supporting frame; and
         a plurality of rollers rotatably mounted on the pressing plate,
   wherein the driving member is configured to drive the first transmission belt and the first rolling mechanism to slide relatively to the storage assembly, such that the first rolling mechanism is configured to flatten a plurality of protective film supported on the storage assembly;
   the mechanical arm is configured to drive the application apparatus to vacuum-lift a top layer of the protective film and move the application apparatus and the top layer to rest against the plurality of rollers and reciprocate relatively to the rollers, the mechanical arm is configured to drive the application apparatus to apply the protective film.

2. The film-applying machine of claim 1, wherein the driving assembly further comprise a driver, a first transmission member, and two first pulleys; the driver is coupled to the driving member; the first transmission member is mounted on the supporting member and meshed with the driver; the two first pulleys are mounted on the supporting member and spaced from each other; one of the two first pulleys is coupled to the first transmission member; the first transmission belt is wound on the two first pulleys.

3. The film-applying machine of claim 2, wherein the driving assembly further comprises a second transmission member, a second transmission belt, and two second pulleys; the second transmission member is mounted to the supporting member and meshed with the first transmission member; the two second pulleys are mounted to the supporting member and spaced from each other; the second transmission belt is wound on the two second pulleys.

4. The film-applying machine of claim 3, wherein the rolling mechanism further comprises a second rolling assembly; an end of the second rolling assembly is coupled to the second transmission belt, another end is slidably coupled to the supporting frame, the driving member is configured to drive the second rolling assembly to slide relatively to the supporting frame.

5. The film-applying machine of claim 1, wherein the film-applying machine further comprises a controlling platform electrically coupled to the mechanical arm, the application apparatus, and the storage apparatus; the controlling platform is configured to control the mechanical arm, the application apparatus, and the storage apparatus to cooperate to apply the protective film to the workpiece.

6. The film-applying machine of claim 5, wherein the film-applying machine further comprises a peeling apparatus adjacent to the mechanical arm and electrically coupled to the controlling platform; the peeling apparatus comprises a holding member mounted to the supporting frame, and a sucking member mounted to the holding member.

7. The film-applying machine of claim 6, wherein the peeling apparatus further comprises a gas nozzle mounted on an end of the sucking member; an end surface of the gas nozzle defines a through hole.

8. The film-applying machine of claim 1, wherein the storage assembly comprises a storage member movably mounted in the supporting frame, and a positioning member is removably mounted to the storage member.

9. The film-applying machine of claim 1, wherein the supporting frame comprises a basic plate mounted to the bracket, a movable plate slidably mounted on the basic plate, and a guiding assembly coupled to the movable plate; the storage assembly is sleeved on the guiding assembly.

10. The film-applying machine of claim 9, wherein the storage mechanism further comprises a lifting adjusting member mounted on the basic plate; an end of the lifting adjusting member is coupled to the storage assembly.

11. The film-applying machine of claim 9, wherein the supporting frame further comprises a first holder perpendicularly mounted on the basic plate and a first guiding rod perpendicularly mounted on the first holder; the storage assembly is slidably sleeved on the first guiding rod.

12. The film-applying machine of claim 9, wherein the storage mechanism further comprises a first adjusting member mounted to a first holder, an end of the first adjusting member is coupled to the storage assembly.

13. The film-applying machine of claim 11, wherein the supporting frame further comprises a second holder perpendicularly mounted on the basic plate, and a second guiding rod perpendicularly mounted on the second holder; the second holder is coupled to the first holder and perpendicular to the first holder; the storage assembly is slidably sleeved on the second guiding rod.

14. The film-applying machine of claim 12, wherein the storage mechanism further comprises a second adjusting member mounted to a second holder, an end of the second adjusting member is coupled to the storage assembly.

15. The film-applying machine of claim 1, wherein the application apparatus comprises a first mounting plate coupled to the mechanical arm, a second mounting plate coupled to a mounting portion, a sucking plate mounted on the second mounting plate, and a connecting member mounted on the second mounting plate; the connecting member defines an inlet extending through the second mounting plate and the connecting member; the sucking plate defines a plurality of holes communicating with the inlet.

16. The film-applying machine of claim 15, wherein the application apparatus further comprises a cushion; an end of the cushion is coupled to the first mounting plate, another end is coupled to the second mounting plate.

17. The film-applying machine of claim 15, wherein the sucking plate defines a sunken portion on a surface facing the second mounting plate; the sunken portion communicates with the inlet and the holes the application apparatus further comprises a sealing member surrounding the portion.

18. A film-applying machine, comprising:
a bracket;
a mechanical arm adjacent to the bracket;
an application apparatus coupled to the mechanical arm; and
a storage apparatus coupled to the bracket and comprising:
a storage mechanism comprising:
a supporting frame mounted to the bracket; and
a storage assembly adjustably coupled to the supporting frame;
a driving mechanism, comprising:
a supporting member coupled to the supporting frame;
a driving assembly, comprising a driving member coupled to the supporting member and
a first transmission belt coupled to the driving member; and
a first rolling mechanism comprising:
a pressing plate having an end coupled to the first transmission belt and another end slidably coupled to the supporting frame; and
a plurality of rollers rotatably mounted on the pressing plate.

19. The film-applying machine of claim 18, wherein the driving assembly further comprise a driver, a first transmission member, and two first pulleys; the driver id coupled to the driving member; the first transmission member is mounted on the supporting member and meshed with the driver; the two first pulleys are mounted on the supporting member and spaced from each other; one of the two first pulleys is coupled to the first transmission member; the first transmission belt is wound on the two first pulleys.

20. A film-applying machine, comprising:
a bracket;
a mechanical arm adjacent to the bracket;
an application apparatus coupled to the mechanical arm;
a storage apparatus coupled to the bracket and comprising:
a storage mechanism comprising:
a supporting frame mounted to the bracket; and
a storage assembly adjustably coupled to the supporting frame;
a driving mechanism comprising:
a supporting member coupled to the supporting frame;
a driving assembly, comprising a driving member coupled to the supporting member; and
a first transmission belt coupled to the driving member; and
a first rolling mechanism, comprising:
a pressing plate having an end coupled to the first transmission belt and another end slidably coupled to the supporting frame; and
a plurality of rollers rotatably mounted on the pressing plate; and
a controlling platform electrically coupled to the mechanical arm, the application apparatus, and the storage apparatus; wherein the controlling platform is configured to control the mechanical arm, the application apparatus, and the storage apparatus to cooperate to apply the protective film.

* * * * *